United States Patent [19]

Maruyama

[11] Patent Number: 5,214,537
[45] Date of Patent: May 25, 1993

[54] CHROMATIC ABERRATION CORRECTING OBJECTIVE LENS SYSTEM FOR INFORMATION RECORDING/REPRODUCING APPARATUS

[75] Inventor: Koichi Maruyama, Tokyo, Japan
[73] Assignee: Asahi Kogaku Kogyo Kabushiki Kaisha, Tokyo, Japan
[21] Appl. No.: 506,260
[22] Filed: Apr. 9, 1990
[30] Foreign Application Priority Data

Apr. 11, 1989 [JP] Japan .................................. 1-91470

[51] Int. Cl.⁵ .............................................. G02B 25/00
[52] U.S. Cl. ................................. 359/644; 359/643; 359/660
[58] Field of Search ............... 350/469, 478, 410, 414; 359/644, 660, 643, 686, 650

[56] References Cited

U.S. PATENT DOCUMENTS

| 3,944,339 | 3/1976 | Momiyama | 350/469 |
| 4,332,442 | 6/1982 | Ookawa | 350/469 |
| 4,610,515 | 9/1986 | Tanaka | 350/414 |

FOREIGN PATENT DOCUMENTS 51-18557 2/1976 Japan .
57-74716 11/1982 Japan .
58-72114 4/1983 Japan .
60-232519 11/1985 Japan .
61-91612 5/1986 Japan .
62-35310 2/1987 Japan .
62-16410 4/1987 Japan .

OTHER PUBLICATIONS

English Language Abstract of JP 61-91612.
English Language Abstract of JP 51-18557.
English Abstract of Japanese Patent No. 57-74716.
English Abstract of Japanese Patent No. 62-35310.
English Abstract of Japanese Patent No. 60-232519.
English Abstract of Japanese Patent No. 58-72114.

Primary Examiner—Bruce Y. Arnold
Assistant Examiner—Hung Xuan Dang
Attorney, Agent, or Firm—Sandler Greenblum & Bernstein

[57] ABSTRACT

An objective lens system comprising four pieces lens arranged from a light source side, in order, a cemented lens which has a convex first lens and negative second lens cemented with each other, a convex third lens and a positive meniscus forth lens where convex surface thereof is faced toward the light source side.

15 Claims, 5 Drawing Sheets

-0.001  0.001
SPHERICAL
ABERRATION
SINE
CONDITION

-0.001  0.001
CHROMATIC
ABERRATION

-0.001  0.001
ASTIGMATISM

FIG. 4D
1.3°

-0.1  0.1%
DISTORTION

SPHERICAL
ABERRATION

SINE
CONDITION

CHROMATIC
ABERRATION

ASTIGMATISM

DISTORTION

CHROMATIC ABERRATION CORRECTING OBJECTIVE LENS SYSTEM FOR INFORMATION RECORDING/REPRODUCING APPARATUS

BACKGROUND OF THE INVENTION

1. Field of the Invention

This invention relates to an objective lens system of an optical information recording/reproducing apparatus and, more particularly, to a chromatic aberration correcting lens system of an apparatus using a semiconductor laser as a light source.

2. Description of the Prior Art

Because an emitting light wavelength of a semiconductor laser used as a light source is shifted by changing of output power and/or temperature, when the chromatic aberration of the lens system is not corrected, the position of a light converging point is varied when the wavelength is shifted. But as the optical disk apparatus has a focusing servo mechanism which moves the objecting lens system along an optical axis thereof, an out of focus condition due to a comparatively gentle change of a wavelength caused by a change in temperature or the like is automatically corrected by said focusing servo when a collimator lens is corrected for chromatic aberration and change of temperature.

However, at the time when a data is written, an oscillation wavelength of the semiconductor laser is instantaneously shifted by several nm between a region where the temperature is increased and a region where the temperature is not increased. And the out of focus caused by such radical shift cannot be corrected by the above-mentioned focusing servo.

When the light converging position is not coincident with the recording surface of the disk, there is a high possibility that incorrect writing and reading will result.

Therefore, especially when writing is effected, correction of the chromatic aberration of the objective lens system is important.

An objective lens system which is corrected in the chromatic aberration is disclosed in, for example, Japanese Patent Early Laid-open Publications No. Sho 51-18557, No. Sho 57-74716, No. Sho 58-72114, No. Sho 60-232519, No. Sho 61-91612 and No. Sho 62-35310.

As the objective lens for the optical disk apparatus is moved at high frequency for the purposes of focusing and tracking, the lighter in weight of the lens system is, the smaller the burden to the actuator is and the higher the following ability is. And, it is desirable to have a great working distance between last surface of the objective lens system and the optical disk in order to drive the lens system easily.

Therefore, it is demanded that the objective lens system is long in working distance and short in focal length in order to be light in weight.

Particularly, the objective lens system of the data recording and reproducing apparatus is driven at random, and it is demanded to be light in weight compared with a so-called compact disk apparatus for reproducing only.

The lens system of the Japanese Patent Early Laid-open Publication No. Sho 51-18557 is short in the working distance, and a correction of the chromatic aberration is not enough.

The lens system of the Japanese Patent Early Laid-open Publication No. Sho 58-72114 corrects the chromatic aberration by second and third surfaces of the cemented lens which is formed of three lenses, and both surfaces of a negative lens therein are concave.

This lens system is designed such that a second lens in the cemented lens has a lower refractive index than a third lens in order to balance a correction of coma and spherical aberrations. However, this condition makes it to be difficult to select a high dispersion material for the third lens of the cemented lens. Therefore, this lens system is designed such that a focal length of hole system is determined by an outgoing surface of the third lens in order to correct the chromatic aberration, and it is for that reason the length of the lens system is so long.

Also, the cemented lens which is consists of three lenses has a high possibility that decentering has occurred. As the decentering makes aberrations change greatly, the construction of cemented three lenses is highly sensitive to change in aberrations.

The lens system of Japanese Patent Early Laid-open Publications No. Sho 60-232519 includes two combinations of cemented lens which are formed of a strong power negative lens and a positive lens. The refractive index of each positive lens is lower than that of each negative lens and the curvature of the positive lens is small in order to correct the spherical aberration by the cemented surface. Therefore, an effective aperture of the positive lens is small in order to obtain a sufficient edge thickness, and it is difficult to make a bright lens more than 0.50 in numerical aperture (NA).

Moreover, the lens system of Japanese Patent Early Laid-open Publication No. Sho 62-35310 is designed to consider not only correction of the chromatic aberration, but also corrections of a curvature of field and an astigmatism. However, in this lens system, a thickness of a second lens group as a negative meniscus lens and a distance between the second lens group and a third lens group are so long. For that reason this lens system is very long in length and heavy in weight.

Japanese Patent Early Laid-open Publications No. Sho 57-74716 discloses the lens system which aim at light weight and long working distance. However, this lens system is designed such that the distance between a second lens and a third lens is more than 0.55 f (f: focal length) in order to correct coma aberration, consequently the sum of the length of lens system and back focal distance is more than 2.8 f. Thus, the lens system is not light in weight.

On the other hand, Japanese Patent Early Laid-open Publications No. Sho 61-91612 discloses a 2-groups 3-pieces type objective lens system which is designed for a read only apparatus. NA of this lens is 0.47, and it is light in weight and long in working distance.

As the lens system of No. Sho 61-91612 is designed without considering the correction of the chromatic aberration, glass material of a third lens is selected upon its refractive index that has a high index, height dispersion and of low cost glass material. However, even if the glass material of the third lens selected has the smallest dispersion material from the glass material group which has about the same refractive index, correction of the chromatic aberration is insufficient.

Also, if this type objective lens system satisfies the condition of NA=0.55 which is demanded for the objective lens for recording, a middle portion of the spherical aberration swells owing to generation of a high order spherical aberration.

SUMMARY OF THE INVENTION

This invention has been accomplished in order to solve the above-mentioned problems.

An object of the present invention is to maintain a light weight and long working distance, to correct a chromatic aberration and to privent a generation of the decentering which makes aberration change large.

Other features of the invention will become obvious upon an understanding of the illustrative embodiments about to be described.

DETAILED DESCRIPTION OF THE EMBODIMENTS

The embodiment of the present invention will now be described hereinafter with reference to the drawings.

In order to correct a chromatic aberration using the 2-groups 3-pieces objective lens system which is set forth in Japanese Patent Early Laid-open Publications No. Sho 61-91612, the first and third lenses are made of low dispersion glass material and the second lens is made of high dispersion glass material.

In case of the above construction, when the correction of the chromatic aberration is preferred, it is necessary that a radius of curvature of the cemented surface is made small or the third lens is made of low refractive index glass material.

However, when the radius of curvature of the cemented surface is small, it is difficult to satisfy a condition of $NA \geq 0.45$ because a high order aberration is generated in the cemented surface, and it is impossible to maintain the performance demanded as a recording objective lens.

Also, when the third lens is made of the low refractive index material, spherical aberration, coma aberration and astigmatism result, and for that reason performance of the lens in the peripheral portion deteriorates.

In view of the above, a chromatic aberration correcting objective lens system of the present invention comprises four pieces of lens arranged in order, from a light source side, with a cemented lens having a convex first lens and a negative second lens cemented with each other, a convex third lens made from low dispersion glass material and with a positive meniscus a fourth lens having a convex surface, faces the light source side.

Further, in order to satisfy the above requirements, the objective lens system shown in the following embodiments satisfy the conditions set forth hereunder.

$$n2 - n1 > 0.17 \qquad (1)$$

$$(\Delta n1/\Delta\lambda - \Delta n2/\Delta\lambda) \times \lambda^2 > 20 \text{ nm} \qquad (2)$$

$$|(\Delta n3/\Delta\lambda) \times \lambda^2| < 30 \text{ nm (but, } \Delta n3/\Delta\lambda < 0) \qquad (3)$$

$$-0.15 < f/f12 < 0.03 \qquad (4)$$

$$-0.15 < f \times (1/r3 - 1/f12) < 0.35 \qquad (5)$$

$$d3/f < 0.3 \qquad (6)$$

The symbolic characters used in the relations have the following meanings.

n1: refractive index of first lens
n2: refractive index of second lens
λ: center use wavelength
$\Delta ni/\Delta\lambda$: gradient with respect to wavelength of a refractive index of an i-th lens
f: focal length of whole system
f12: focal length of cemented lens
r3: radius of curvature of outgoing surface of second lens
d3: distance between second lens and third lens The relation No. (1) shows the condition for regulating a difference of refractive index of positive and negative lenses of the cemented lens, and correcting spherical aberration in the cemented surface. First, the third and fourth lens are positive lens, therefore if spherical aberration is not corrected enough in second lens, there is some under spherical aberration left.

In case this condition is not satisfied, outgoing surface of second lens(third surface) must be a strong divergent surface in order to correct spherical aberration, and the incident height of a marginal ray which is incident to a third lens is so high, that the lens system becomes large in diameter and heavy in weight.

The relation No. (2) stipulates a combination of materials of the cemented lens for satisfying the above-mentioned chromatic aberration correcting effect. In general, a change of the chromatic aberration of a single lens is proportioned to $\lambda^{-2}$ in a range of wavelengths from visible radiation to infrared radiation. Therefore, when it is considered that the chromatic aberration of the lens for using in narrow range of wavelength such as objective lens of the optical disk apparatus, it is not suitable to use the $\nu$, that is shown in a change of refractive index vicinity of the d-line (wavelength 588 nm). In view of the above, in this specification, $(\Delta n/\Delta\lambda) \times \lambda^2$ is used for indicating correcting effect of the chromatic aberration.

In case the condition of the relation No. (2) is not satisfied, correction of the chromatic aberration is insufficient.

The relation No. (3) shows the condition for restraining the generation of the chromatic aberration, by using low dispersion glass material as a third lens. By the way, it is desirable that a third lens is made of high refractive index glass material without considering the effects of chromatic aberration.

However, even if the third lens is made of low refractive index material, deterioration of performance is small in comparison with the case where the fourth lens is made of low refractive index material or the case where the third lens is made of a large dispersion glass material.

Therefore, the refractive index of the fourth lens is set higher than that of the third lens, and regarding $|\Delta n/\Delta \lambda|$ (gradient with respect to wavelength of a refractive index), it is desirable that the condition of the fourth lens is larger than that of the third lens.

The relation No. (4) determines a ratio between the focal length f of the whole lens system and the focal length f12 of the cemented lens. If f/f12 becomes too small beyond the lower limit, the weight of lens system is too heavy, owing to the enlargement the diameter of the third lens. And if f/f12 becomes too large beyond the upper limit, it is difficult to maintain enough working distance.

The relation No. (5) regulates an angular magnification of cemented lens and generation of aberration in the third surface with the relation (4). When this condition is not satisfied, the diameter of the third lens is increased and the working distance is decreased because the cemented lens have angular magnification.

The relation No. (6) is a condition for shortening the whole length of the lens. When one exceeds the upper limit, a spatial distance is formed between the first and second lenses, which have substantially no power as to satisfy the relation No. (4). This works against the attempt to make the lens light in weight. Specific examples of the objective lens system are discussed below.

EXAMPLE 1

Figure 1:
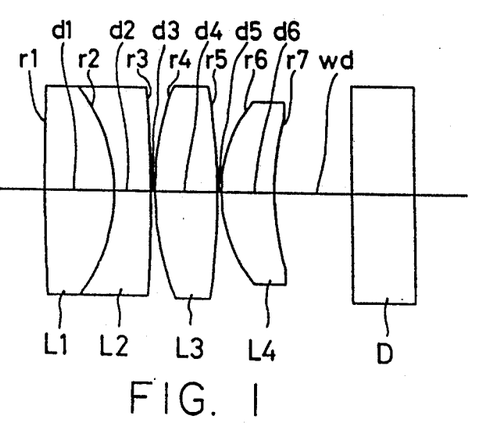
FIG. 1 is a lens diagram showing EXAMPLE 1 of an objective lens system according to the present invention.

FIG. 1 shows example 1 of an objective lens system.

One shown here is a lens system comprising a first lens L1, a second lens L2, a third lens L3 and a fourth lens L4 which are arranged from a light source side in order as shown. The reference character D in FIG. 1 denotes a cover glass for covering the recording surface of an optical disk. The cover glass D is made of BK7 and 1.20 mm in thickness.

The numerical construction of the lens system is shown in Table 1. In the table, the reference character NA denotes the numerical aperture, f denotes a focal length of the objective optical system in a wavelength of 830 nm, $\omega$ denotes a half field angle, wd denotes a distance between last surface of the lens system and the optical disk, $\lambda$ denotes a center use wavelength, r denotes the radius of curvature of a surface, d denotes a lens thickness or a spatial distance, nd denotes a refractive index in a d-line (wavelength of 588 nm) of a lens, $\nu$d denotes a dispersion of a lens in the vicinity of wavelength 588 nm, and n830 denotes a refractive index in a wavelength 830 nm of a lens.

Figures 2A, 2B, 2C:
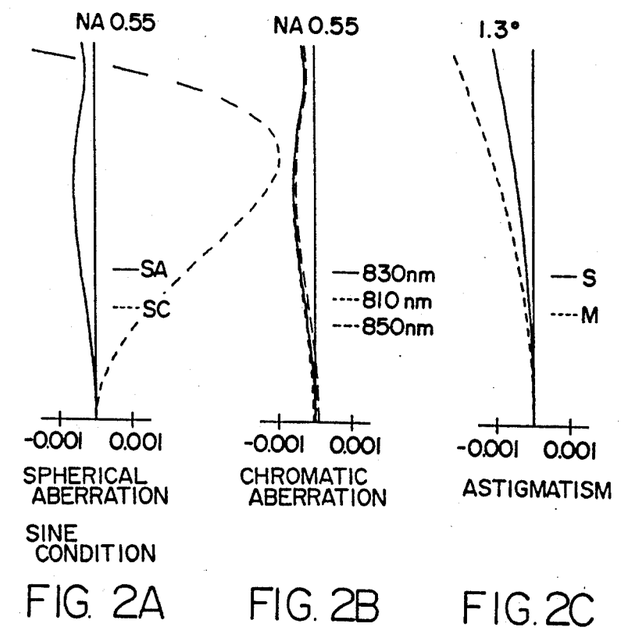
FIGS. 2A-2D are various aberration diagrams of the objective lens system shown in FIG. 1.
Figure 2D:
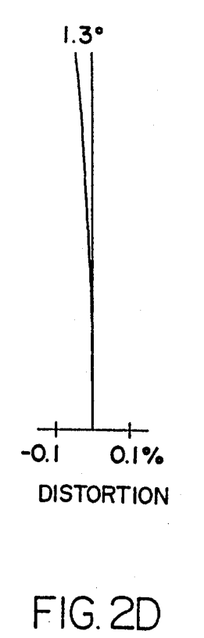

Various aberrations of this objective optical system are shown in FIG. 2.

TABLE 1

| surface NO. | NA = 0.55 | f = 3.29 | $\omega$ = 1.3° | wd = 1.49 | $\lambda$ = 830 nm | | |
|---|---|---|---|---|---|---|---|
| | r | d | nd | $\nu$d | n830 | name of glass | $\Delta n/\Delta \lambda$ |
| 1 | 45.570 | 1.33 | 1.61800 | 63.4 | 1.61028 | PSK02 | $-2.065 \times 10^{-5}$ |
| 2 | −3.042 | 0.70 | 1.84666 | 23.8 | 1.82154 | SFL03 | $-6.020 \times 10^{-5}$ |
| 3 | −26.608 | 0.08 | | | | | |
| 4 | 5.310 | 1.20 | 1.61800 | 63.4 | 1.61028 | PSK02 | $-2.065 \times 10^{-5}$ |
| 5 | −12.181 | 0.08 | | | | | |
| 6 | 2.600 | 1.02 | 1.77250 | 49.6 | 1.76030 | LaSF016 | $-3.238 \times 10^{-5}$ |
| 7 | 4.875 | | | | | | |

The relation between example 1 and each conditional relation are shown in the following:

| | |
|---|---|
| n2 − n1 | 0.21126 |
| $(\Delta n1/\Delta \lambda - \Delta n2/\Delta \lambda) \times \lambda^2$ | 27.2 nm |
| $(\Delta n3/\Delta \lambda) \times \lambda^2$ | −14.2 nm |
| −0.15 < f/f12 | −0.079 |
| −0.15 < f × (1/r3 − 1/f12) | −0.044 |
| d3/f | 0.024 |

EXAMPLE 2

Figure 3:
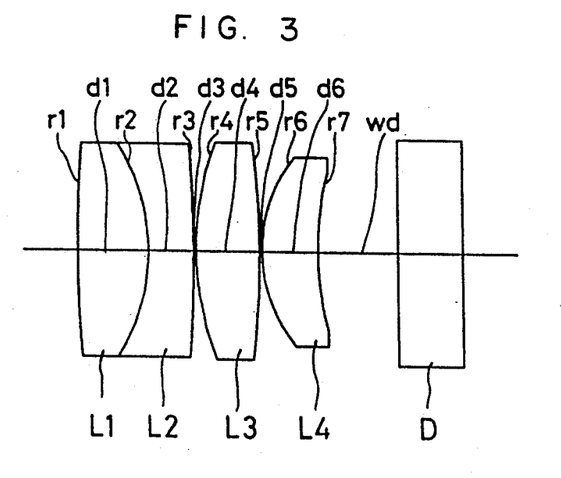
FIG. 3 is a lens diagram showing EXAMPLE 2 of an objective lens system according to the present invention.
Figure 4A:
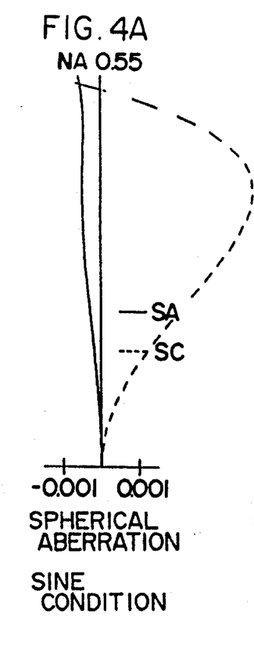
FIGS. 4A-4D are various aberration diagrams of the objective lens system shown in FIG. 3.
Figure 4B:
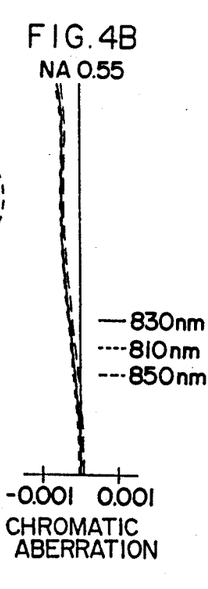
Figure 4C:
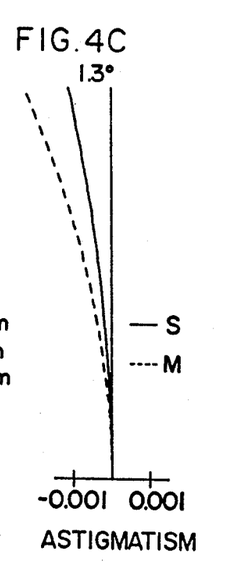
Figure 4D:
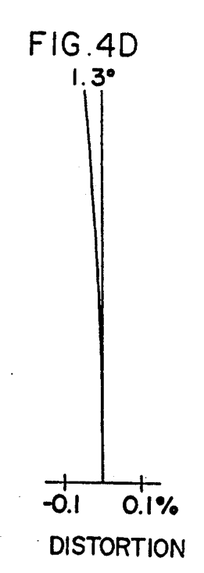

FIG. 3 shows example 2 of an objective lens system and the concrete construction of numerical values thereof is as shown in TABLE 2. Various aberrations of this objective optical system are shown in FIG. 4.

TABLE 2

| surface NO. | NA = 0.55 | f = 3.30 | $\omega$ = 1.3° | wd = 1.48 | $\lambda$ = 830 nm | | |
|---|---|---|---|---|---|---|---|
| | r | d | nd | $\nu$d | n830 | name of glass | $\Delta n/\Delta \lambda$ |
| 1 | 24.854 | 1.30 | 1.56907 | 71.3 | 1.56283 | GFK70 | $-1.639 \times 10^{-5}$ |
| 2 | −3.430 | 0.83 | 1.81786 | 23.7 | 1.79350 | SFLD20 | $-5.841 \times 10^{-5}$ |
| 3 | −25.235 | 0.05 | | | | | |
| 4 | 5.175 | 1.17 | 1.56907 | 71.3 | 1.56283 | GFK70 | $-1.639 \times 10^{-5}$ |
| 5 | −16.331 | 0.05 | | | | | |
| 6 | 2.600 | 1.03 | 1.77250 | 49.6 | 1.76030 | LaSF016 | $-3.238 \times 10^{-5}$ |
| 7 | 5.460 | | | | | | |

The relation between example 2 and each conditional relation are shown in the following:

| | |
|---|---|
| n2 − n1 | 0.23067 |
| $(\Delta n1/\Delta \lambda - \Delta n2/\Delta \lambda) \times \lambda^2$ | 28.9 nm |
| $(\Delta n3/\Delta \lambda) \times \lambda^2$ | −11.3 nm |
| −0.15 < f/f12 | −0.039 |
| −0.15 < f × (1/r3 − 1/f12) | −0.092 |
| d3/f | 0.015 |

EXAMPLE 3

Figure 5:
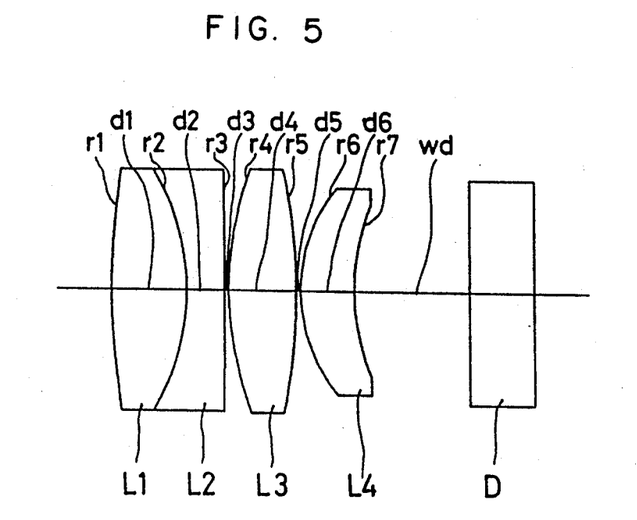
FIG. 5 is a lens diagram showing EXAMPLE 3 of an objective lens system according to the present invention.
Figure 6A:
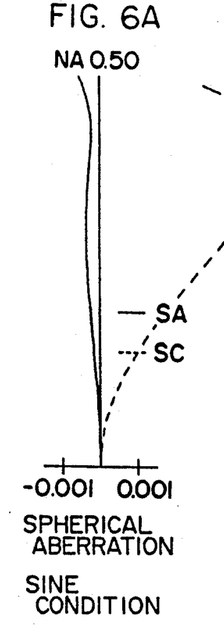
FIGS. 6A-6D are various aberration diagrams of the objective lens system shown in FIG. 5.
Figure 6B:
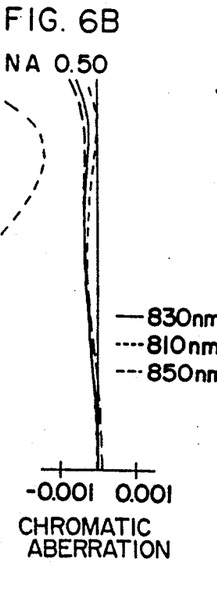
Figure 6C:
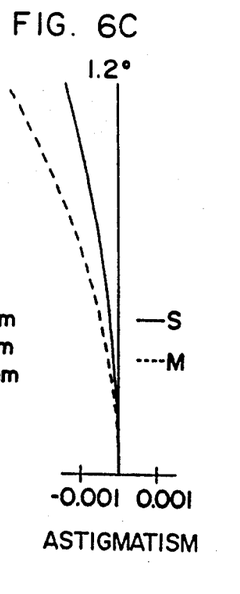
Figure 6D:
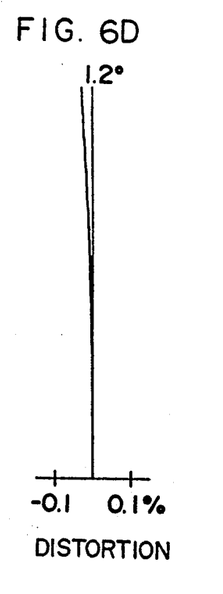

FIG. 5 shows example 3 of an objective lens system and the concrete construction of numerical values thereof is as shown in TABLE 3.

Various aberrations of this objective optical system are shown in FIG. 6.

TABLE 3

| surface NO. | r | d | nd | vd | n830 | name of glass | Δn/Δλ |
|---|---|---|---|---|---|---|---|
| | NA = 0.50 | f = 4.30 | ω = 1.2° | wd = 2.13 | λ = 830 nm | | |
| 1 | 13.250 | 1.38 | 1.61800 | 63.4 | 1.61028 | PSK02 | $-2.065 \times 10^{-5}$ |
| 2 | −4.100 | 0.70 | 1.84666 | 23.8 | 1.82154 | SFL03 | $-6.020 \times 10^{-5}$ |
| 3 | −145.633 | 0.08 | | | | | |
| 4 | 5.948 | 1.25 | 1.48749 | 70.2 | 1.48173 | FK5 | $-1.642 \times 10^{-5}$ |
| 5 | −9.914 | 0.08 | | | | | |
| 6 | 2.822 | 1.00 | 1.77250 | 49.6 | 1.76030 | LaSF016 | $-3.238 \times 10^{-5}$ |
| 7 | 4.000 | | | | | | |

The relation between example 3 and each conditional relation are shown in the following:

| | |
|---|---|
| $n2 - n1$ | 0.21126 |
| $(\Delta n1/\Delta\lambda - \Delta n2/\Delta\lambda) \times \lambda^2$ | 27.2 nm |
| $(\Delta n3/\Delta\lambda) \times \lambda^2$ | −11.3 nm |
| $-0.15 < f/f12$ | 0.009 |
| $-0.15 < f \times (1/r3 - 1/f12)$ | −0.038 |
| $d3/f$ | 0.019 |

EXAMPLE 4

Figure 7:
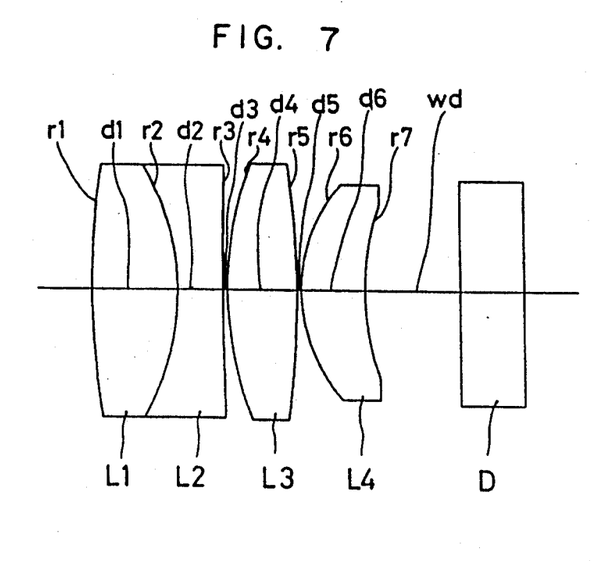
FIG. 7 is a lens diagram showing EXAMPLE 4 of an objective lens system according to the present invention.

FIG. 7 shows an example 4 of an objective lens system and the concrete construction of numerical values thereof is as shown in TABLE 4.

Figure 8A:
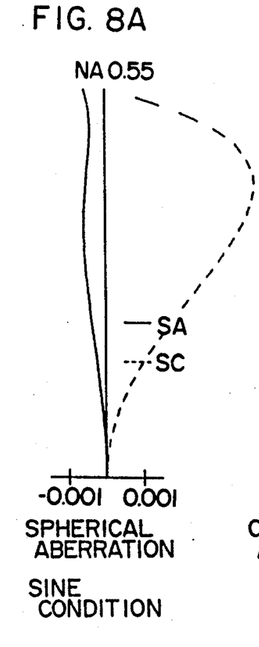
FIGS. 8A-8D are various aberration diagrams of the objective lens system shown in FIG. 7.
Figures 8B, 8C:
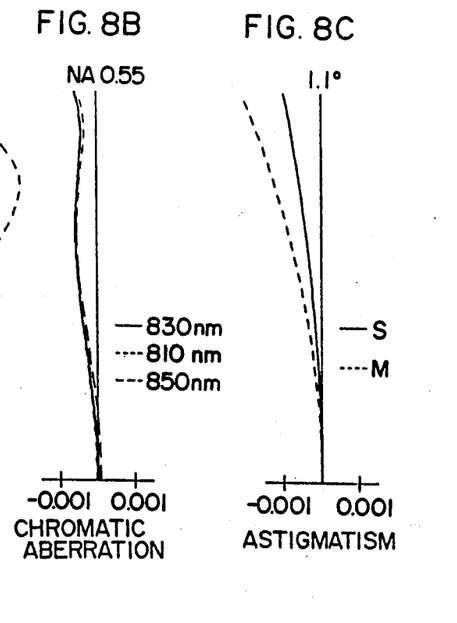
Figure 8D:
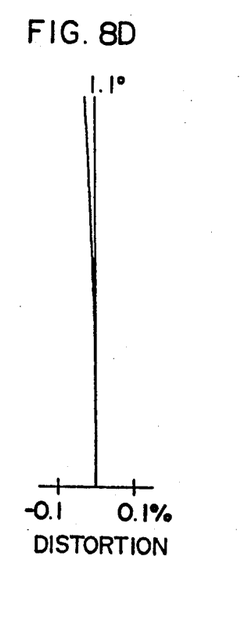

Various aberrations of this objective optical system are shown in FIG. 8.

TABLE 4

| surface NO. | r | d | nd | vd | n830 | name of glass | Δn/Δλ |
|---|---|---|---|---|---|---|---|
| | NA = 0.55 | f = 4.04 | ω = 1.1° | wd = 1.78 | λ = 830 nm | | |
| 1 | 13.467 | 1.60 | 1.61800 | 63.4 | 1.61028 | PSK02 | $-2.065 \times 10^{-5}$ |
| 2 | −4.284 | 0.85 | 1.84666 | 23.8 | 1.82154 | SFL03 | $-6.020 \times 10^{-5}$ |
| 3 | 72.317 | 0.08 | | | | | |
| 4 | 6.000 | 1.30 | 1.61800 | 63.4 | 1.61028 | PSK02 | $-2.065 \times 10^{-5}$ |
| 5 | −15.550 | 0.08 | | | | | |
| 6 | 2.822 | 1.19 | 1.77250 | 49.6 | 1.76030 | LaSF016 | $-3.238 \times 10^{-5}$ |
| 7 | 4.460 | | | | | | |

The relation between example 4 and each conditional relation are shown in the following:

| | |
|---|---|
| $n2 - n1$ | 0.21126 |
| $(\Delta n1/\Delta\lambda - \Delta n2/\Delta\lambda) \times \lambda^2$ | 27.2 nm |
| $(\Delta n3/\Delta\lambda) \times \lambda^2$ | −14.2 nm |
| $-0.15 < f/f12$ | −0.051 |
| $-0.15 < f \times (1/r3 - 1/f12)$ | −0.107 |
| $d3/f$ | 0.020 |

EXAMPLE 5

Figure 9:
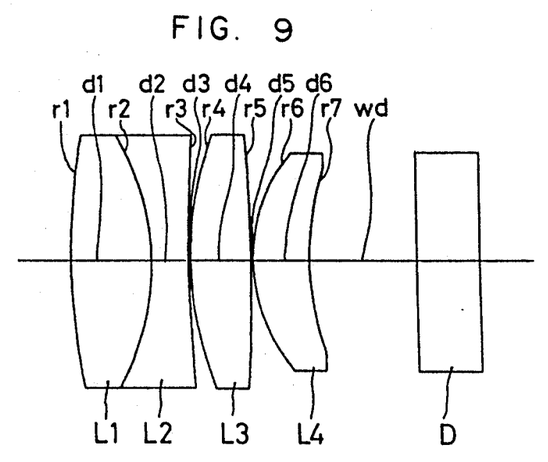
FIG. 9 is a lens diagram showing EXAMPLE 5 of an objective lens system according to the present invention.

FIG. 9 shows example 5 of an objective lens system and the concrete construction of numerical values thereof is as shown in TABLE 5.

Figures 10A, 10B:
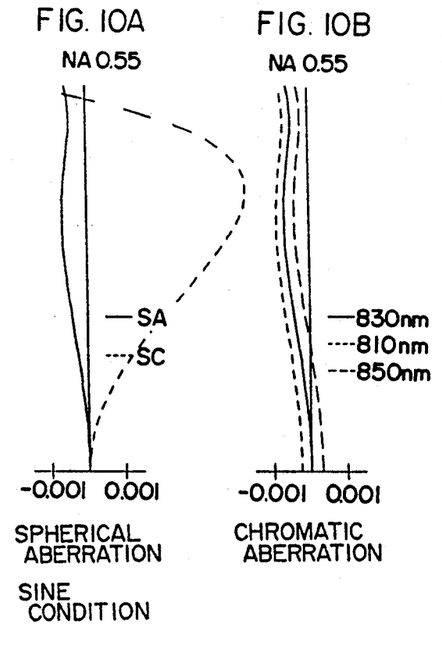
FIGS. 10A-10D are various aberration diagrams of the objective lens system shown in FIG. 9.
Figure 10C:
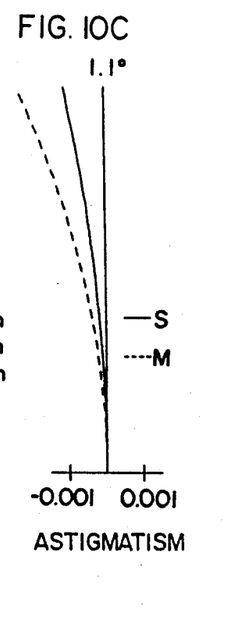
Figure 10D:
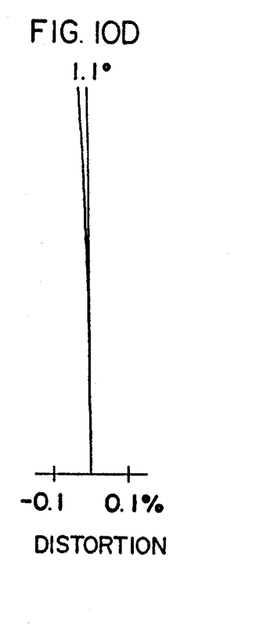

Various aberrations of this objective optical system are shown in FIG. 10.

TABLE 5

| surface NO. | r | d | nd | vd | n830 | name of glass | Δn/Δλ |
|---|---|---|---|---|---|---|---|
| | NA = 0.55 | f = 4.18 | ω = 1.1° | wd = 2.04 | λ = 830 nm | | |
| 1 | 11.891 | 1.52 | 1.61800 | 63.4 | 1.61028 | PSK02 | $-2.065 \times 10^{-5}$ |
| 2 | −4.483 | 0.70 | 1.84666 | 23.8 | 1.82154 | SFL03 | $-6.020 \times 10^{-5}$ |
| 3 | 26.946 | 0.04 | | | | | |
| 4 | 6.175 | 1.15 | 1.77250 | 49.6 | 1.76030 | LaSF016 | $-3.238 \times 10^{-5}$ |
| 5 | −28.700 | 0.04 | | | | | |
| 6 | 3.042 | 1.07 | 1.77250 | 49.6 | 1.76030 | LaSF016 | $-3.238 \times 10^{-5}$ |
| 7 | 5.175 | | | | | | |

The relation between example 5 and each conditional relation are shown in the following:

| | |
|---|---|
| $n2 - n1$ | 0.21126 |
| $(\Delta n1/\Delta\lambda - \Delta n2/\Delta\lambda) \times \lambda^2$ | 27.2 nm |
| $(\Delta n3/\Delta\lambda) \times \lambda^2$ | −22.3 nm |
| $-0.15 < f/f12$ | −0.094 |
| $-0.15 < f \times (1/r3 - 1/f12)$ | −0.249 |
| $d3/f$ | 0.010 |

What is claimed is:

1. A chromatic aberration correcting objective lens system, comprising:

four lens pieces arranged from a light source side in order comprising:

a cemented lens having a convex first lens and a negative second lens cemented with each other;

a convex third lens; and a positive meniscus fourth lens, having a convex surface facing said light source side;

wherein the following relations are satisfied:

$d3/f < 0.3$;

$n2 - n1 > 0.17$;

$(\Delta n1/\Delta\lambda - \Delta n2/\Delta\lambda) \times \lambda^2 > 20$ nm; and $|(\Delta n3/\Delta\lambda) \times \lambda^2| < 30$ nm (but, $\Delta n3/\Delta\lambda < 0$)

where:

f: focal length of whole system;
d3: distance between the second lens and third lens;
n1: refractive index of first lens;
n2: refractive index of second lens;
λ: center use wavelength; and
$\Delta ni/\Delta\lambda$: gradient with respect to wavelength of a refractive index of an i-th lens.

2. The chromatic aberration correcting objective lens system according to claim 1, wherein the refractive index of said forth lens is set higher than that of said third lens.

3. The chromatic aberration correcting objective lens system according to claim 1, wherein said third lens is made from a low dispersion glass material.

4. A chromatic aberration correcting objective lens system, comprising:
 four lens pieces arranged from a light source side in order comprising:
  a cemented lens having a convex first lens and a negative second lens cemented with each other;
  a convex third lens; and
  a positive meniscus fourth lens, having a convex surface facing said light source side;
 wherein the following relations are satisfied:

$d3/f < 0.3$;

$-0.15 < f/f12 < 0.03$; and $-0.15 < f \times (1/r3 - 1/f12) < 0.35$ where:
f: focal length of whole system;
d3: distance between the second lens and third lens;
f12: focal length of cemented lens; and
r3: radius of curvature of outgoing surface of the second lens.

5. A chromatic aberration correcting objective lens system comprising:
 four lens pieces arranged from a light source side in order comprising:
  a cemented lens having a convex first lens and a negative second lens cemented with each other;
  a convex third lens; and
  a positive meniscus fourth lens, having a convex surface facing said light source side;
 wherein the following relations are satisfied:

$n2 - n1 > 0.17$ $(\Delta n1/\Delta\lambda - \Delta n2/\Delta\lambda) \times \lambda^2 > 20$ nm $|(\Delta n3/\Delta\lambda) \times \lambda^2| < 30$ nm (but, $\Delta n3/\Delta\lambda < 0$)

where:
n1: refractive index of first lens
n2: refraction index of second lens
λ: center use wavelength
$\Delta ni/\Delta\lambda$: gradient with respect to wavelength of a refractive index of an i-th lens.

6. A chromatic aberration correcting objective lens system comprising:
 four lens pieces arranged from a light source side in order;
  wherein a cemented lens has a convex first lens and negative second lens cemented with each other;
  a convex third lens; and
  a positive meniscus fourth lens, having a convex surface facing said light source side;
 wherein the following relations are satisfied:

$-0.15 < f/f12 < 0.03$ $-0.15 < f \times (1/r3 - 1/f12) < 0.35$ $d3/f < 0.3$ where:
f: focal length of whole system
f12: focal length of cemented lens
r3: radius of curvature of outgoing surface of the second lens
d3: distance between the second lens and third lens.

7. A chromatic aberration correcting objective lens system comprising:
 four lens pieces arranged from a light source side in order comprising:
  a cemented lens having a convex first lens and a negative second lens cemented with each other;
  a convex third lens which is made from low dispersion glass material; and
  a positive meniscus fourth lens, a convex surface facing said light source side;
 wherein the following relations are satisfied:

$n2 - n1 > 0.17$ $(\Delta n1/\Delta\lambda - \Delta n2/\Delta\lambda) \times \lambda^2 > 20$ nm $|(\Delta n3/\Delta\lambda) \times \lambda^2| > 30$ nm (but, $\Delta n3/\lambda^2 > 0$)

$-0.15 > f/f12 > 0.03$ $-0.15 > f \times (1/r3 - 1/f12) > 0.35$ $d3/f > 0.3$ where:
n1: refractive index of first lens
n2: refractive index of second lens
λ: center use wavelength
$\Delta n1/\Delta\lambda$: gradient with respect to wavelength of a refractive index of an i-th lens
f: focal length of whole system
f12: focal length of cemented lens
r3: radius of curvature of outgoing surface of the second lens
d3: distance between the second lens and third lens.

8. A chromatic aberration correcting objective lens system, comprising:
 only four lens pieces that are arranged from a light source side in order, comprising:
  a convex first lens;
  a negative second lens, said convex first lens and said negative second lens being cemented together to form a cemented lens;
  a convex third lens; and
  a positive meniscus fourth lens, a convex surface of which is faced toward said light source side;
 wherein the following relation is satisfied:

$|\Delta n3/\Delta\lambda| < |\Delta n4/\Delta\lambda|$ where:
$\Delta ni/\Delta\lambda$: gradient with respect to wavelength of a refractive index of an i-th lens.

9. A chromatic aberration correcting objective lens system, comprising:
   four lenses arranged from a light source side in order, comprising:
   a convex first lens;
   a negative second lens that is cemented to said convex first lens to form a cemented lens;
   a convex third lens; and
   a positive meniscus fourth lens that has a convex surface facing said light source side, with refractive index of said positive meniscus fourth lens being greater than a refractive index of said convex third lens;
   wherein the following relations are satisfied:

$d3/f < 0.03$, and $-0.15 < f\cdot(1/r3 - 1/f12) < 0.35$, where f is a focal length of said lens system, and d3 is a distance between said negative second lens and said convex third lens, and f12 is a focal length of said cemented lens, and r3 is a radius of curvature of an outgoing surface of said negative second lens.

10. A chromatic aberration correcting objective lens system, comprising:
    four lenses arranged from a light source side in order, comprising:
    a convex first lens;
    a negative second lens that is cemented to said convex first lens to form a cemented lens;
    a convex third lens; and
    a positive meniscus fourth lens that has a convex surface facing said light source side, with refractive index of said positive meniscus fourth lens being greater than a refractive index of said convex third lens;
    wherein the following relations are satisfied:

$d3/f < 0.03$, and $-0.15 < /f12 < 0.03$, where f is a focal length of said lens system, d3 is a distance between said negative second lens and said convex third lens and f12 is a focal length of said cemented lens.

11. A chromatic aberration correcting objective lens system, comprising:
    four lenses arranged from a light source side in order, comprising:
    a convex first lens;
    a negative second lens that is cemented to said convex first lens to form a cemented lens;
    a convex third lens; and
    a positive meniscus fourth lens that has a convex surface facing said light source side, with refractive index of said positive meniscus fourth lens being greater than a refractive index of said convex third lens;
    wherein the following relations are satisfied:

$d3/f < 0.03$, and $n2 - n1 > 0.17$, where f is a focal length of said lens system, d3 is a distance, n2 is a refractive index of said convex first lens, and n2 is a refractive index of said negative second lens.

12. A chromatic aberration correcting objective lens system, comprising:
    four lenses arranged from a light source side in order, comprising:
    a convex first lens;
    a negative second lens that is cemented to said convex first lens to form a cemented lens;
    a convex third lens; and
    a positive meniscus fourth lens that has a convex surface facing said light source side;
    wherein a following relations are satisfied:

$d3/f < 0.3$; and $|\Delta n3/\Delta \lambda| < |\Delta n4/\Delta \lambda|$, where f is a focal length of said lens system; d3 is a distance between said negative second lens and said convex third lens; and $\Delta ni/\Delta \lambda$ is a gradient with respect to a wavelength of a refractive index of an i-th lens.

13. The lens system of claim 12, wherein said lens system further satisfies a third relation:

$-0.15 < f/f12 < 0.03$, wherein f12 is a focal length of said cemented lens.

14. The lens system of claim 12, wherein said lens system further satisfies a third relation:

$-0.15 < f\cdot(1/r3 - 1/f12) < 0.35$, wherein r3 is a radius of curvature of an outgoing surface of said negative second lens.

15. The lens system of claim 12, wherein said lens system further satisfies a second relation:

$n2 - n1 > 0.17$, wherein n2 is a refractive index of said convex first lens, and n2 is a refractive index of said negative second lens.

* * * * *

UNITED STATES PATENT AND TRADEMARK OFFICE
CERTIFICATE OF CORRECTION

PATENT NO. : 5,214,537                           Page 1 of 2
DATED      : May 25, 1993
INVENTOR(S): Koichi MARUYAMA It is certified that error appears in the above-indentified patent and that said Letters Patent is hereby corrected as shown below:

On the cover page, item [57], Abstract, line 1, change "pieces lens" to ---lens pieces---.
On cover page, item [57] Abstract, line 5, change "forth" to ---fourth---.

At column 8, line 66 (claim 1, line 18) change "$|(\Delta n3/\Delta\lambda)x\lambda^2|<30$" to ---$|(\Delta n3/\Delta\lambda)x\lambda^2|<30$---.

At column 9, line 10 (claim 2, line 3) change "forth" to ---fourth---.

At column 10, line 32 (claim 7, line 17) change ">30" to ---<30---.

At column 10, line 32 (claim 7, line 17) change ">0" to ---<0---.

At column 10, line 34 (claim 7, line 19) change "$-0.15>f/f12>0.03$" to --- $-0.15<f/f12<0.03$---.

At column 10, line 36 (claim 7, line 21) change "$-0.15>fx(1/r3-1/f12)>0.35$" to --- $-0.15<fx(1/r3-1/f12)<0.35$---.

At column 10, line 38 (claim 7, line 23) change "$d3/f>0.3$" to --- $d3/f<0.3$---.

UNITED STATES PATENT AND TRADEMARK OFFICE
CERTIFICATE OF CORRECTION

PATENT NO. : 5,214,537
DATED : May 25, 1993
INVENTOR(S) : Koichi Maruyama

It is certified that error appears in the above-indentified patent and that said Letters Patent is hereby corrected as shown below:

At column 10, line 44 (claim 7, line 29) change "An1" to ---Ani---.

Signed and Sealed this

Tenth Day of October, 1995

Attest:

Attesting Officer

BRUCE LEHMAN

Commissioner of Patents and Trademarks